Patented June 26, 1951

2,558,020

UNITED STATES PATENT OFFICE 2,558,020

BASIC ESTERS OF 2-ARYL-2-(1-HYDROXY-CYCLOHEXYL) ETHANOIC ACID AND ACID ADDITION SALTS OF THE SAME

Gino R. Treves, New York, N. Y., assignor to Schieffelin & Co., New York, N. Y., a corporation of New York No Drawing. Application May 20, 1949,
Serial No. 94,535

11 Claims. (Cl. 260—473)

This invention relates to compounds having mydriatic activity, and specifically to dialkylamino alkyl esters of 2-aryl-2-(1-hydroxycyclohexyl) ethanoic acids and to acid addition salts of the same. The aryl radical is chosen from the group consisting of phenyl and alkoxyphenyl.

One of the drawbacks of atropine, which is one of the best known mydriatic agents, is that its mydriatic activity is in many cases much more prolonged than is desirable. The present compounds possess advantageous mydriatic properties to a degree comparable to that of atropine but of a more practical duration, the mydriatic effect lasting but a few hours, as compared to a duration of up to a week for atropine. The time of onset and development of full mydriasis is also considerably shorter than for atropine. The compounds are further valuable as antispasmodics.

A specific example of one of the present compounds is beta-(dimethylamino)ethyl ester of 2 - phenyl - 2 - (1-hydroxy-4-methylcyclohexyl) ethanoic acid, the hydrochloride of which may be written structurally as follows:

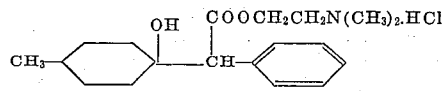

As stated, the phenyl group may contain alkoxy substituents such as methoxy, ethoxy, etc. The cyclohexyl group preferably contain alkyl substituents, although it may be unsubstituted. In the ester moiety of the above compound, by which is meant the —CH$_2$CH$_2$N(CH$_3$)$_2$.HCl portion, other groups having three, four, five, six, etc. carbon atoms, preferably not more than six, may replace the ethylene and/or methyl groups. When alkoxy substituents are present in the phenyl group, those containing up to six carbon atoms are preferred. Other acid addition salts besides the hydrochloride are the sulfate, nitrate, phosphate, acetate, etc.

The following examples may illustrate the preparation of the compounds.

Example 1

To a well stirred mixture of 2.4 gms. of magnesium turnings and 10.8 gms. of sodium (4-methoxyphenyl) acetate covered with 20 cc. of anhyrous ether, 9.4 cc. of isopropyl bromide in 50 cc. of anhydrous ether are added dropwise. The mixture is refluxed for 1 hour and then 5.7 cc. of cyclohexanone in 25 cc. of anhydrous ether are added. The mixture is again refluxed for 1 hour and then decomposed by pouring it in ice water containing some hydrochloric acid. The oily material which separates is extracted with ether, and the latter dried over anhydrous sodium sulfate. The ether is then distilled off and the residue dissolved in benzene from which crystalline material is collected. The product is 2-(4-methoxyphenyl) - 2 - (1-hydroxycyclohexyl) ethanoic acid, melting at 146° C. Of this, 3.6 gms. in 25 cc. anhydrous isopropyl alcohol is refluxed for 16 hours with 1.8 gms. of beta-chloroethyl dimethylamine. The cooled product of the reaction is filtered clear of solid by-products and then isopropyl alcohol is removed under reduced pressure on the steam bath. The oily residue is washed with anhydrous ether and then dissloved in ethyl acetate from which, on cooling, crystalline material is obtained. The product is the hydrochloride of beta-dimethylamino ethyl ester of 2-(4-methoxyphenyl)-2-(1-hydroxycyclohexyl) ethanoic acid. Melting point 146–148° C.

Example 2

A mixture was prepared containing 2.4 gms. of magnesium turnings, 9 gms. of sodium phenyl acetate, and 25 cc. of anhydrous ether. Then 9.4 cc. of isopropyl bromide in 50 cc. of anhydrous ether are added dropwise with stirring. The mixture is refluxed for 1 hour after the addition is completed and then 6.4 gms. of 4-methylcyclohexanone in 25 cc. of anhydrous ether is added dropwise. The mixture is again refluxed for 1 hour and then poured over ice containing a small amount of hydrochloric acid. The ether solution is extracted with 200 cc. of 5% sodium hydroxide. The alkaline solution on acidification with hydrochloric acid gave a precipitate which was filtered off, dried and crystallized from ethylene dichloride. The precipitate is 2-phenyl-2-(1-hydroxy-4-methylcyclohexyl) ethanoic acid, melting at 168–172° C. Of this, 5.7 gms. in 35 cc. of dry isopropyl alcohol is refluxed for 16 hours with 2.5 gms. of beta-chlorethyl dimethyl amine. The cooled product of the reaction is filtered clear from the solid by-product. The solvent is removed on the steam bath under reduced pressure, and the residue is washed with anhydrous ether. The oily residue is then dissolved in ethyl acetate from which, on cooling, solid material is precipitated. This is recrystallized from a mixture of ethyl acetate and absolute ethanol. It is the hydrochloride of beta-(dimethylamino) ethyl ester of 2 - phenyl - 2 - (1-hydroxy-4-methylcyclohexyl) ethanoic acid. Melting point 150–153° C.

Example 3

To a well stirred mixture of 9 gms. of sodium phenyl acetate and 2.4 gms. of magnesium turnings in 25 cc. of anhydrous ether, a solution of 9.4 cc. of isopropyl bromide in 50 cc. of anhydrous ether are added. The mixture is refluxed for one hour and then 5.7 cc. of cyclohexanone in 25 cc. of anhydrous ether are added dropwise. The mixture is again refluxed for one hour and poured over ice water containing some hydrochloric acid. The ether solution is separated and extracted with 200 cc. of 5% sodium hydroxide. The alkaline solution on acidification gives the free acid which is filtered off, dried in a desiccator and recrystallized from ethylene dichloride. The product is 2 - phenyl - 2 - (1 - hydroxycyclohexyl) ethanoic acid. It melts at 136° C. Of this product, 6.3 gms. in 35 cc. of dry isopropyl alcohol are refluxed for 16 hours with 3.2 gms. of beta-chloroethyl dimethyl amine. The solution is cooled and filtered clear of solid by-products, and then the solvent is removed under reduced pressure on the steam bath. The residue is washed with anhydrous ether and dissolved in ethyl acetate, from which it crystallizes. It is the hydrochloride of beta - (dimethylamino) ethyl ester of 2 - phenyl-2 - (1 - hydroxycyclohexyl) ethanoic acid. Melting point 135° C.

The acid addition salts of Examples 1, 2 and 3 were tested in the rabbit eye and found to possess mydriatic activity. The salt of Example 1 showed definite measurable mydriasis after 7 minutes, maximal dilatation in about 30 minutes, submaximal dilatation in about 35 minutes, and the pupil was essentially normal in about 3 hours. The salt of Example 2 showed definite measurable mydriasis in about 8 minutes, maximal dilatation in about 25 minutes, submaximal dilatation in about 3 hours, and the pupil was normal in about 7 hours. Mydriasis produced by the salt of Example 3 was measurable in about 7 minutes, became maximal in about 20 minutes, submaximal in about 3 hours, and the pupil was normal in about 6 hours. The compounds tested were in concentrations of 2% by weight in physiological saline solution. It will be noted, as between Examples 1 and 3, that the effect of alkoxy substitution in the phenyl group is to reduce the duration of maximal dilatation.

The free bases may be obtained from the salts of Examples 1, 2 and 3 by treating the salts with an alkali such as an aqueous solution of sodium hydroxide, potassium hydroxide, or sodium carbonate, etc. The salts are preferable over the free bases because of their solubility in water.

In the light of the foregoing description, the following is claimed:

1. A compound selected from the class consisting of dialkylamino alkyl ester of 2-aryl-2-(1-hydroxycyclohexyl)ethanoic acid and its acid addition salt, in which aryl is a radical from the group consisting of phenyl and alkoxyphenyl, said alkyl and alkoxy groups each containing up to six carbon atoms.

2. Dialkylamino alkyl ester of 2-phenyl-2-(1-hydroxycyclohexyl)ethanoic acid, said alkyl groups each containing up to six carbon atoms.

3. The acid addition salt of dialkylamino alkyl ester of 2-phenyl-2-(1-hydroxycyclohexyl)ethanoic acid, said alkyl groups each containing up to six carbon atoms.

4. Dialkylamino alkyl ester of 2-(alkoxyphenyl)-2-(1-hydroxycyclohexyl)ethanoic acid, said alkyl and alkoxy groups each containing up to six carbon atoms.

5. The acid addition salt of dialkylamino alkyl ester of 2-(alkoxyphenyl)-2-(1-hydroxycyclohexyl)ethanoic acid, said alkyl and alkoxy groups each containing up to six carbon atoms.

6. Beta-(dimethylamino)ethyl ester of 2-phenyl-2-(1-hydroxycyclohexyl)ethanoic acid.

7. The acid addition salt of beta-(dimethylamino)ethyl ester of 2-phenyl-2-(1-hydroxycyclohexyl)ethanoic acid.

8. Beta-(dimethylamino)ethyl ester of 2-phenyl - 2 - (1 - hydroxy - 4 - methylcyclohexyl)ethanoic acid.

9. The acid addition salt of beta-(dimethylamino)ethyl ester of 2-phenyl-2-(1-hydroxy-4-methylcyclohexyl)ethanoic acid.

10. A compound selected from the class consisting of $$\text{A}\underset{\underset{\text{B}}{|}}{\text{CH}}\text{COO(CH}_2)_n\text{N(R)}_2$$

and its acid addition salt, in which A is a group selected from the class consisting of hydroxycyclohexyl and alkyl-substituted hydroxycyclohexyl groups, $n$ is a whole number varying from 1 to 6, R is an alkyl group, and B is a radical selected from the class consisting of phenyl and alkoxyphenyl radicals, said alkyl and alkoxy groups each containing up to 6 carbon atoms.

11. The acid addition salt of beta-(diethylamino)ethyl ester of 2-phenyl-2-(1-hydroxycyclohexyl)ethanoic acid.

GINO R. TREVES.

REFERENCES CITED

The following references are of record in the file of this patent:

UNITED STATES PATENTS

| Number | Name | Date |
|---|---|---|
| 1,987,546 | Blankart | Jan. 8, 1935 |
| 2,346,027 | Hoffmann et al. | Apr. 4, 1944 |
| 2,404,588 | Martin et al. | July 23, 1946 |